C. P. BROWN & J. L. UHLIK.
BUMPER FOR VEHICLES.
APPLICATION FILED JULY 15, 1910.
996,207.
Patented June 27, 1911.
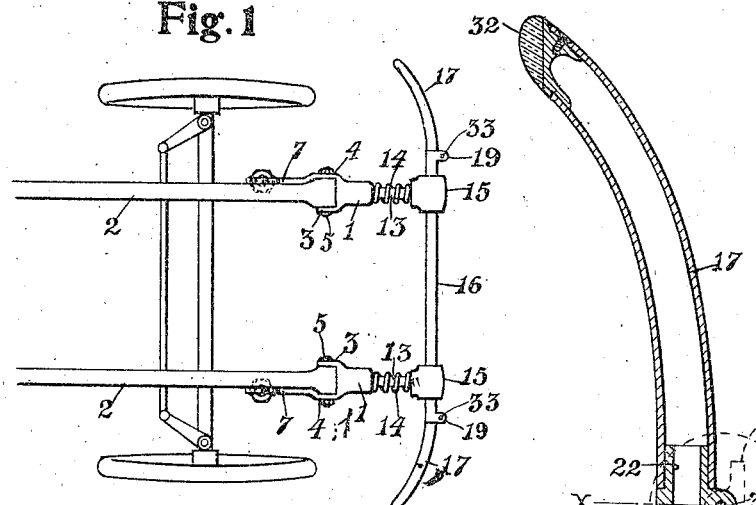
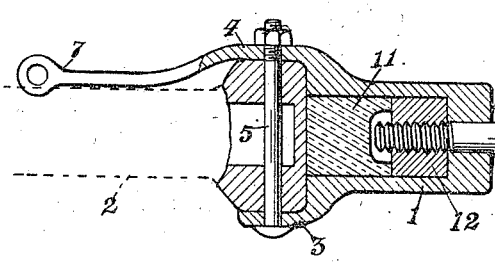
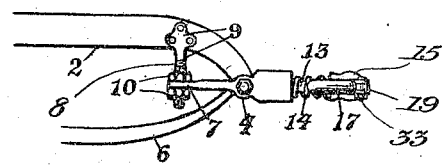
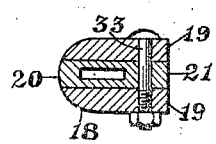 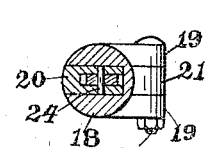
Inventors
COLIN P. BROWN
JOHN L. UHLIK

UNITED STATES PATENT OFFICE.

COLIN P. BROWN AND JOHN L. UHLIK, OF DETROIT, MICHIGAN, ASSIGNORS TO WENTWORTH MANUFACTURING COMPANY, OF DETROIT, MICHIGAN.

BUMPER FOR VEHICLES.

996,207.

Specification of Letters Patent. Patented June 27, 1911.

Application filed July 15, 1910. Serial No. 572,209.

*To all whom it may concern:*

Be it known that we, COLIN P. BROWN and JOHN L. UHLIK, citizens of the United States of America, residing at Detroit, in the county of Wayne and State of Michigan, have invented certain new and useful Improvements in Bumpers for Vehicles, of which the following is a specification, reference being had therein to the accompanying drawings.

This invention relates to a type of bumper which essentially consists of a spring backed rail supported in front of the vehicle body and one object of the invention is to support the bumper in such manner that the thrust is directly brought upon the chassis.

Another object is to make the bumper extend over the whole front of the vehicle without making it liable to interlock with the wheels of other vehicles standing close to it when backing away from the curb all of which objects we accomplish in the manner more fully hereinafter described and shown in the accompanying drawings, in which—

Figure 1 is a diagram plan view of a bumper embodying our invention showing it as attached to the vehicle body; Fig. 2 is a diagrammatic side elevation of the bumper and of the means for supporting it; Fig. 3 is an enlarged horizontal section of part of the bumper; and Figs. 4 and 5 are cross sections of Fig. 3 on the lines x—x, y—y respectively.

Special fittings are provided for the attachment of the bumper rail to the forward ends of an automobile which fittings consist of a pair of buffer casings 1 secured to the forward end of the side members 2 of the chassis by a pair of oppositely disposed rearwardly extending lugs 3 and 4. A bolt 5 which if preferred may also be the supporting means for the vehicle spring 6 passes through the lugs which bear against the sides of the chassis member 2. A strap 7 that is an extension of the lug 4 is engaged at its rearward end by the screwthreaded shank 8 of a hanger 9 riveted or made fast in any preferred manner to the chassis member 2. Nuts 10 or like means hold the strap against movement.

The inner open end of each casing 1 is filled with a buffer block 11 of rubber or like elastic material to resist the rearward movement of a bushing 12 screwthreaded on or otherwise secured to the inner end of a stem 13. The latter is slidingly supported in a guide aperture in the forward end of the casing 1, its rearward movement being resisted not only by the buffer block but by a coiled spring 14 encircling the stem and held under compression between the casing and a transversely apertured head 15 on the outer end of the stem. The heads 15 support a transversely disposed tubular rail which consists of the middle portion 16 and the end portions or arms 17 hinged to the outer ends thereof. As shown in the drawing the hinge comprises a tubular member 18 secured by set screws 31 in the end of portion 16 and extending outwardly therefrom, the projecting portion being horizontally slotted and provided at its end with ears 19. A coöperating hinge member 20 provided with an ear 21 is pivoted by a pin 33 passing through said ear 21 and the ears 19 in the slotted end of the member 18. It has a cylindrical nipple 22 by which the rail member 17 is secured to it. A chain 23 or like flexible connection is secured to the inner end of the hinge member 20 as by a pivot pin 24 or the like and extends axially through the hinge member 18 and rail 16 to a connection with a tension rod 25 which is provided with a washer 28 guiding it in the rail 16. A spiral spring 29 held under compression encircles the rod 27 between the washer 28 and a fixed seat 30 formed in the hinge member 18. The arms 17 preferably form a backward curve and a rubber cap 32 is secured on the outer end of each arm.

In practice the tension of the springs 29 keeps the arms 17 normally extended and the whole appearance is that of a continuous bumper rail extending over the whole front of the vehicle. The arms are firmly held by the hinge joint to resist any force striking against it from the front, in fact the rail is made thereby stronger than a one piece rail but when the vehicle backs and the arms should be caught by adjacent vehicles or other obstructions, either or both arms will be caused to swing forward upon their pivots until the obstruction is passed. In thus swinging forward the tension of the springs 29 is increased and as soon as the arms are released they are automatically returned to place by the springs. Thus injury to the car or to adjacent vehicles or other obstructions is avoided while the bumper rail may be made of proper length to extend the whole width of the car. The construction of the hinge joint is particularly designed to make a strong support and connection between the sections of the rail and to prevent any lost motion that would cause rattling.

Obviously, changes in the details of construction may be made without departing from the spirit of the invention and we do not care to limit ourselves to any particular form or arrangement of parts.

We claim as our invention:—

1. In a vehicle bumper, a bumper rail consisting of a central portion supported by the vehicle, end portions extending therefrom and spring hinges connecting the end portions with the central portions and maintaining them yieldingly in alinement therewith.

2. In a vehicle bumper, a bumper rail comprising a central portion supported by the vehicle, end portions hinged to the outer ends thereof and adapted to swing in a horizontal plane and a tension device connecting each end portion with the central portion and adapted to maintain the end portion in its normal position.

3. In a vehicle bumper, a bumper rail comprising a central portion supported by the vehicle, end portions hinged to the outer ends thereof and adapted to swing in a horizontal plane and tension devices located within the central portion and adapted to maintain the end portions in their normal positions.

4. In a vehicle bumper, a tubular bumper rail comprising a central portion supported by the vehicle, end portions and spring hinges connecting them to the central portion each hinge consisting of two members secured to the adjacent ends of the rail portions respectively and having a tongue and slot engagement with each other, laterally projecting ears on said members pivotally secured together, a tension device in the stationary rail portion and a flexible connection between said tension device and the movable member of the hinge.

5. In a vehicle bumper, a tubular bumper rail comprising a central portion supported by the vehicle, end portions, and spring hinges connecting them to the central portion and maintaining them normally in alinement therewith, the pivotal axis of the hinges being vertical and located forwardly of the body of the rail.

6. In a vehicle bumper, a tubular bumper rail comprising a central portion supported by the vehicle, end portions and spring hinges connecting the end portions with the central portions and maintaining them yieldingly in alinement therewith, each hinge consisting of two members secured to the adjacent ends of the rail portions respectively and pivotally secured together, the two members having a tongue and slot engagement with each other permitting movement in one direction only—the pivot being placed at the outer end of the stationary member and laterally thereof, a tension device housed in the central rail portion and a flexible connection connecting said tension device with the movable member of the hinge.

7. In a vehicle bumper, a bumper rail comprising a central portion supported by the vehicle, end portions, and spring hinges yieldingly connecting them in alinement with the central portion, said end portions being curved rearwardly and provided with rubber caps at their outer ends.

8. In an automobile bumper, the combination with the chassis, of buffer casings supported at the forward ends of the chassis, horizontal supports carrying a bumper rail guided in said casings, buffer springs upon said support, rubber buffers in the casings, a bumper rail having a central section rigidly secured in the outer ends of the supports, and end portions yieldingly secured to the outer ends of the central section.

In testimony whereof we affix our signatures in presence of two witnesses.

COLIN P. BROWN.
JOHN L. UHLIK.

Witnesses:
LEWIS E. FLANDERS,
ANNA M. SHANNON.